Patented July 11, 1939

2,166,076

UNITED STATES PATENT OFFICE 2,166,076

PLATINUM METAL COMPOUNDS AND METHODS OF MAKING THEM

Edgar F. Rosenblatt, East Orange, N. J., assignor to Baker & Company, Inc., Newark, N. J., a corporation of New Jersey No Drawing. Application February 27, 1936, Serial No. 66,068½

7 Claims. (Cl. 260—429)

This invention relates to new compounds, particularly to compounds containing within the molecule a metal of the platinum group combined with one or more organic radicals. For the purpose of this invention, the term "platinum group" is intended to include the following metals: ruthenium, rhodium, palladium, osmium, iridium, platinum.

The present invention is also directed to the use of various compounds of the platinum group of metals and includes inorganic as well as organic compounds thereof. One of the particular features of the present invention is a composition consisting essentially of petroleum hydrocarbons, benzol, benzol-alcohol mixtures, alcohols, or other fuels of organic nature having dissolved therein, either directly or by the intermediate use of a common solvent, the compounds described herein.

For many uses it is desirable that the metal compounds be soluble and stable in organic solvents, as for example in the preparation of lacquers, of coating compositions for the production of mirrors or reflecting surfaces, of metal deposits on non-conducting surfaces for electroplating purposes and the like, and also for catalytic or other uses. The present knowledge of compounds of metals of the platinum group that are soluble in organic solvents is very limited. Especially the oxygen-free solvents such as for instance benzol or gasoline offer the greatest difficulties in dissolving therein any compound of a metal of the platinum group, especially when the required solution has to be stable and has to withstand the reducing influence of the gasoline.

In view of the premises, it is one object of the present invention to produce compounds of these metals, which compounds are soluble in many organic solvents and show therein a high degree of stability when exposed to ordinary conditions of light, heat, gases and the like. These compounds are non-acid in character and do not react ordinarily to produce an acid. They are characterized by the absence of halogens (chlorine, bromine and iodine). As it is possible to prepare a considerable variety of compounds of these metals, I can modify the properties of the compounds to suit nearly every purpose desired. It has thus become possible to bring many such compounds of the platinum metals into solution in benzol, petroleum hydrocarbons or similar solvents.

In practicing the present invention I cause a reaction to take place between a compound having a reactive hydrogen and another compound having a nitrogen-oxygen group bound to the metal of the platinum group either directly or indirectly, such as a nitrite group. As known, this nitrite group has a very great tendency to be in a non-ionized state in complexes with metals of the platinum group.

Nearly all compounds of the platinum metals are not simple salts, but complexes of the Werner type. The compounds which I use to bring about my reaction, therefore, usually do not contain only the platinum metal and the nitrite group but also further ammino groups or nitrites of other metals. Also, they are either ammino nitrites or complex nitrite salts.

As to the hydrogen containing compounds which react with the metal containing complex, both inorganic and organic substances have been found suitable. However, I have found that the organic compounds, and particularly certain aromatic materials such as amines, phenols, and the like are especially suitable for the purpose. The character of the reactions taking place is somewhat complex, and, in some cases, the resulting products are not well defined crystalline substances but are resinous or semi-liquid in character.

As representative of a reaction involving an amine, the following, which uses aniline hydrochloride, may be taken:

$(NH_3)_2M(ONO)_2 + 2C_6H_5NH_2HCl \rightarrow (NH_3)_2M(ONNC_6H_5)_2 + 2H_2O + 2HCl$ The nature of the reaction with phenols, including naphthols, is somewhat difficult to ascertain as the products of the reaction are generally resinous, but most likely the reaction can be represented by the following equation:

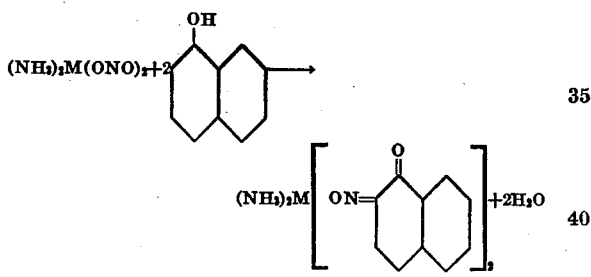

The compound is therefore believed to be a quinone-oxime and may have a tendency to isomerize to a nitroso naphthol, as follows:

In the above equations, the symbol M is intended to indicate a metal of the platinum group.

Although the above equations show the use of definite compounds, these equations should be considered as merely illustrating the nature of the new compounds, and should not be considered as a limitation on the scope of the present invention. The NH₃ group may, of course, be replaced by other ammino groups, for example, those wherein one or more of the hydrogen atoms of ammonia are replaced by radicals, usually of organic nature. The term ammino group should be understood in the broad sense in which it is used in Werner's Complex Chemistry, and as such includes also such groups as hydrazin, hydroxylamine, thioether, phosphine, arsenide, and others.

In a similar manner, in place of the naphthol or aniline, other compounds of a similar nature having a greater or smaller number of carbon atoms and having some of the hydrogen atoms on the rings replaced by various radicals, may be used therein. Heterocyclic compounds may also be used instead of isocyclic compounds.

As a rule, I start my reaction with a complex platinum metal nitrite which may be formed in any desired manner. For example, they may be prepared as follows:

Sodium platino chloride, for example, having the formula $Na_2PtCl_4$ is treated with sodium nitrite and yields a compound $Na_2Pt(NO_2)_4$. This is treated with ammonia in water solution forming $(NH_3)_2Pt(NO_2)_2$. If the ammonia is replaced by a water insoluble compound, such as aniline, it may be necessary to use a shaking machine, and in some cases the reaction may be carried out at a high pressure, as in an autoclave.

Many of the products discovered by me and described herein are soluble to a greater or smaller extent in benzol, carbon tetrachloride, alcohols of different kinds and other solvents. Some of these solutions are, in turn, miscible with or soluble in gasoline or other hydrocarbons and other liquids having fuel value, whereby a small amount of the metal is held in stable combination in the resulting solution.

The addition of metals of the platinum group to gasoline or the like has been found to have an important influence on the chcaracteristics of the gasoline when used as fuel in internal combustion engines whereby the combustion becomes more effective and more suitable for efficient operation of the engine. Exactly what the character of the action is has not yet been determined, but it is possible that the platinum metal being of catalytic nature in other applications, acts to give better, more efficient combustion and so modifies the combustion curve as to make a better, more effective and smoother running engine. The amount of the platinum metal necessary to have an important effect on the fuel is sufficiently small so that although the metals in themselves may be expensive, the increased cost of the fuel is very little.

The following are specific examples of the operation of the present invention:

*Example 1*

25 g. of palladium di-o-toluidine nitrite, having the formula $(o-C_6H_4CH_3NH_2)_2Pd(NO_2)_2$ are suspended in 150 cc. of benzol and warmed. To the mixture are added 18 g. of naphthol and 20 cc. of acetic acid. The solution turns to a deep red color, showing that a reaction has taken place with the formation of the desired compound, and upon evaporation gives a red, noncrystalline resinous product. It is soluble in benzol and can be diluted with relatively large amounts of gasoline without causing precipitation of the metal compound.

*Example 2*

2 g. di-meta-toluidine platinum nitrite having the formula $(m=C_6H_4CH_3NH_2)_2Pt(NO_2)_2$ are warmed in a mixture of 10 cc. toluidine, 2 cc. acetic acid and 2 g. phenol until they are dissolved. Then 4 cc. acetic acid and 60 cc. benzol are added. The solution is extracted with water in a separatory funnel and finally the benzol solution is dried with potassium carbonate and filtered. The concentrated solution is deep red and after dilution yellow. A benzol solution containing about 0.5 g. Pt in 100 cc. is easily dissolved in gasoline without precipitation.

*Example 3*

2 g. platinum di-ammino nitrite having the formula $Pt(NH_3)_2(NO_2)_2$ are suspended in a mixture of 10 cc. o-toluidine, 2 g. beta-naphthol, and 2 cc. acetic acid. The suspension is boiled under a reflux condenser until the compound has gone into solution. 60 cc. benzol and 8 cc. acetic acid are added and the solution extracted with water in a separatory funnel. The benzol solution is dried with potassium carbonate. The concentrated solution is almost black and after dilution reddish-brown. The benzol solution can be diluted with large amounts of gasoline.

*Example 4*

The solutions of 5 g. palladium di-ammine nitrite having the formula $Pd(NH_3)_2(NO_2)_2$ in 300 cc. hot water and 5 g. aniline hydrochloride in 300 cc. water are poured together. After a short time a voluminous crystalline deposit of a tan color is precipitated. The precipitate is soluble in methyl and amyl alcohol.

*Example 5*

1 g. of sodium ruthenium nitrite having the formula $Na_3Ru(NO_2)_6$ is heated to a moderate temperature with 2 cc. of meta-toluidine and 1.2 cc. of acetic acid. Thereafter, methyl alcohol is added and the solution is filtered, evaporated to dryness, dissolved in benzol, and filtered. During the treatment, the mixture becomes colored, showing the formation of the complex compound. The benzol solution is filtered and it may be diluted with gasoline to form the desired solution containing a small amount of the ruthenium compound.

*Example 6*

Ammonium rhodium nitrite, having the formula $(NH_4)_3Rh(NO_2)_6$ or $(NH_4)_2NaRh(NO_2)_6$ in suspension in o-toluidine, is boiled after addition of alpha-naphthol and a few drops of acetic acid. The color of the solution gradually becomes a dark reddish, showing the progress of the reaction. The solution may be dissolved in benzol and then gasoline without causing precipitation of the reaction product.

*Example 7*

Platinum di-pyridine nitrite is mixed with toluidine, alpha-naphthol and a few drops of acetic acid, and the mixture is warmed. The reaction progresses resulting in a deep red colored solution. This solution may be diluted with benzol and afterwards with gasoline without precipitation of the reaction product.

*Example 8*

1 g. of sodium ruthenium nitrite is dissolved in a small amount of water. 1 g. of alpha-naphthol, 6 cc. of ortho-toluidine and 4 cc. of acetic acid are added. The mixture is warmed on a water bath, the solution gradually assuming a deep red color. Benzol is then added and the mixture shaken and afterwards separated in a separatory funnel. The benzol solution containing the reaction product is washed with water and dried with potassium carbonate and filtered. The benzol solution may be diluted with gasoline without precipitation of the product.

Example 9

Potassium platinum nitrite having the formula $K_2[Pt(NO_2)_4]$ is mixed with aniline hydrochloride in concentrated water solution. A white precipitate is formed which is filtered and dissolved in methyl alcohol. Aniline hydrochloride is added causing the solution to become deeply colored, showing the formation of the desired reaction product. This reaction probably proceeds first by the formation of an aniline salt having the formula $(C_6H_5NH_3)_2Pt(NO_2)_4$ which by further reaction with additional aniline hydrochloride in methyl alcohol gives the desired reaction between the nitrite and the aniline. The solution is evaporated to dryness, dissolved in acetone, filtered from the excess aniline hydrochloride, and evaporated to dryness. The red product is soluble in ethyl alcohol or dioxane and is slightly soluble in benzol.

Example 10

1 g. beta-naphthylaminium iridium nitrite having the formula $(C_{10}H_7NH_3)_3Ir(NO_2)_6$ and 3 g. beta-naphthol are boiled in amyl alcohol until the compound is dissolved. The solution is then diluted with dioxane and filtered. The addition of gasoline precipitates a deep red iridium compound.

Example 11

1 g. of platinum di-o-toluidine nitrite is suspended in dioxane and to the mixture is added 1 g. of beta-naphthol and a few drops of acetic acid. Upon boiling the mixture, the reaction takes place with the formation of a red colored compound. The solution is evaporated to dryness and the product is dissolved in benzol.

Example 12

Palladium di-ammine nitrite having the formula $Pd(NH_3)_2(NO_2)_2$ reacts with naphthylamine hydrochloride in water and forms different compounds depending on the relative amount of the components added. The color of the compounds changes from red to green by the addition of more naphthylamine hydrochloride. The green compound containing 3 molecules naphthylamine per atom palladium can be prepared as follows: 0.5 g. palladium di-ammine nitrite is dissolved in 300 cc. water. The solution is added drop by drop to a boiling solution of 2 g. naphthylamine hydrochloride in 100 cc. water, each drop forming at first the red compound and then changing to the deep green precipitate.

In a similar manner to the above, various other reaction products may be obtained from the various platinum metals, using the same in various combinations. As described above, I can vary within a wide range, for each metal, the ammino groups used in the reaction as well as the compounds furnishing the reactive hydrogen and I can thus produce innumerable new compounds. The properties thereof, including color and solubility in various solvents, depend chiefly on the proper choice of these two constituents. The examples given will clearly illustrate this principle.

From the above it is obvious that the present invention is susceptible to various modifications and alterations. Not only may various starting materials be used, but the various procedures whereby the various products are obtained may be varied within a wide range. These and other changes in the scope of the present invention may be made in the spirit thereof. The invention, therefore, is to be broadly construed except as limited by the claims appended hereto.

The reaction products which I obtain by the use of phenol, including naphthol, are very suitable for the preparation of mirrors on metals, glass, porcelain or other surfaces by coating the surfaces with a thin layer of the compound in resinous or semi-liquid stage and afterwards heating the object so as to decompose the compound and obtain a metallic surface.

What I claim is:

1. The reaction product of a complex containing a platinum group metal having at least one nitrite group and a phenol, the reactive hydrogen of said phenol reacting with oxygen of said group under the formation of a compound containing the radicals of both starting compounds combined into one molecule.

2. The reaction product of a metal ammino nitrite of a platinum group metal and an aromatic amine, the reactive hydrogen of said amine reacting with oxygen of the nitrite group under the formation of a compound containing the radicals of both starting compounds combined into one molecule.

3. The reaction product of a metal ammino nitrite of a platinum group metal and a phenol, the reactive hydrogen of said phenol reacting with oxygen of the nitrite group under the formation of a compound containing the radicals of both starting compounds combined into one molecule.

4. A method of making complex platinum group metal compounds which comprises mixing a platinum group metal compound containing a nitrite group with an organic compound having a reactive hydrogen, adding acetic acid thereto, said reactive hydrogen reacting with oxygen of the nitrite group resulting in a linkage between the radicals of both starting compounds in one molecule.

5. A method of making complex platinum group metal compounds which comprises dissolving in an organic solvent a platinum group metal ammino nitrite with an aromatic amine, heating the mixture, the reactive hydrogen reacting with oxygen of the nitrite group resulting in a linkage between the radicals of both starting compounds in one molecule.

6. A method of making complex platinum group metal compounds which comprises dissolving in an organic solvent a platinum group metal ammino nitrite with a phenol, heating the mixture, the reactive hydrogen reacting with oxygen of the nitrite group resulting in a linkage between the radicals of both starting compounds in one molecule.

7. A method of making complex platinum group metal compounds which comprises dissolving in an organic solvent a platinum group metal compound containing a nitrite group with an aromatic organic compound having a reactive hydrogen, said reactive hydrogen reacting with oxygen of the nitrite group resulting in a linkage between the radicals of both starting compounds in one molecule.

EDGAR F ROSENBLATT.